United States Patent
Lin et al.

(10) Patent No.: US 11,307,853 B2
(45) Date of Patent: Apr. 19, 2022

(54) MATRIX MULTIPLICATION DEVICE AND OPERATION METHOD THEREOF

(71) Applicant: NEUCHIPS CORPORATION, Hsinchu (TW)

(72) Inventors: Chiung-Liang Lin, Hsinchu (TW); Chao-Yang Kao, Hsinchu (TW); Youn-Long Lin, Hsinchu (TW); Huang-Chih Kuo, Hsinchu (TW); Jian-Wen Chen, Hsinchu (TW)

(73) Assignee: NEUCHIPS CORPORATION, Hsinchu (TW)

( * ) Notice: Subject to any disclaimer, the term of this patent is extended or adjusted under 35 U.S.C. 154(b) by 415 days.

(21) Appl. No.: 16/667,900

(22) Filed: Oct. 29, 2019

(65) Prior Publication Data

US 2021/0064373 A1    Mar. 4, 2021

(30) Foreign Application Priority Data

Aug. 27, 2019 (TW) ................. 108130520

(51) Int. Cl.
| | | |
|---|---|---|
| *G06F 9/30* | (2018.01) | |
| *G06F 1/3228* | (2019.01) | |
| *G06F 17/16* | (2006.01) | |
| *G06F 7/544* | (2006.01) | |

(52) U.S. Cl.
CPC ........ *G06F 9/30014* (2013.01); *G06F 1/3228* (2013.01); *G06F 7/5443* (2013.01); *G06F 9/30036* (2013.01); *G06F 9/30109* (2013.01); *G06F 17/16* (2013.01)

(58) Field of Classification Search
CPC .... G06F 17/16; G06F 7/5443; G06F 9/30014; G06F 9/30036; G06F 9/30109
See application file for complete search history.

(56) References Cited

U.S. PATENT DOCUMENTS

| | | | |
|---|---|---|---|
| 2015/0088954 A1* | 3/2015 | Bakos ............... | G06F 17/16 708/607 |
| 2018/0189638 A1 | 7/2018 | Nurvitadhi et al. | |
| 2019/0034558 A1 | 1/2019 | Leeman-Munk et al. | |
| 2019/0042237 A1* | 2/2019 | Azizi ............... | G06F 9/3802 |

FOREIGN PATENT DOCUMENTS

| | | |
|---|---|---|
| CN | 108664447 | 10/2018 |
| CN | 108805266 | 11/2018 |
| TW | 201020939 | 6/2010 |
| TW | 201837793 | 10/2018 |

\* cited by examiner

*Primary Examiner* — Michael D. Yaary
(74) *Attorney, Agent, or Firm* — JCIPRNET

(57) ABSTRACT

A matrix multiplication device and an operation method thereof are provided. The matrix multiplication device includes calculation circuits, a control circuit, a multiplication circuit, and a routing circuit. The calculation circuits produce multiply-accumulate values. The control circuit receives a plurality of first element values of a first matrix. The control circuit classifies the first element values into at least one classification value. The multiplication circuit multiplies the classification value by a second element value of a second matrix in a low power mode to obtain at least one product value. The routing circuit transmits each of the product values to at least one corresponding calculation circuit in the calculation circuits in the low power mode.

25 Claims, 5 Drawing Sheets

MATRIX MULTIPLICATION DEVICE AND OPERATION METHOD THEREOF

CROSS-REFERENCE TO RELATED APPLICATION

This application claims the priority benefit of Taiwan application serial no. 108130520, filed on Aug. 27, 2019. The entirety of the above-mentioned patent application is hereby incorporated by reference herein and made a part of this specification.

BACKGROUND OF THE INVENTION

1. Field of the Invention

The invention relates to a calculation circuit, and in particular, to a matrix multiplication device and an operation method thereof.

2. Description of Related Art

In operation processes of some electronic circuits, a matrix multiplication operation, that is, a multiply-accumulate (MAC) operation, is required. For example, a neural network model circuit requires a large number of multiply-accumulate operations. In general, the multiply-accumulate operation has extremely high power consumption.

SUMMARY OF THE INVENTION

The invention provides a matrix multiplication device and an operation method thereof to multiply a first matrix by a second matrix to produce a product matrix.

An embodiment of the invention provides a matrix multiplication device. The matrix multiplication device may multiply a first matrix by a second matrix to produce a product matrix. The matrix multiplication device includes a plurality of first calculation circuits, a control circuit, a multiplication circuit, and a routing circuit. The first calculation circuits are configured to produce a plurality of first multiply-accumulate values in a first column of the product matrix. The control circuit is configured to receive a plurality of first element values in a column of the first matrix during a first period. The control circuit classifies the first element values into at least one first classification value. When a first classification quantity of the at least one first classification value is less than or equal to a first classification threshold, the control circuit controls the first calculation circuits to operate in a low power mode. When a first classification quantity is greater than a first classification threshold, the control circuit controls the first calculation circuits to operate in a normal mode. The multiplication circuit is configured to respectively multiply the at least one first classification value by a second element value in a row of the second matrix in the low power mode to obtain at least one first product value. The routing circuit is coupled to the multiplication circuit to receive the at least one first product value. The routing circuit transmits each of the at least one first product value to at least one corresponding calculation circuit in the first calculation circuits in the low power mode.

An embodiment of the invention provides an operation method of a matrix multiplication device. The matrix multiplication device is configured to multiply a first matrix by a second matrix to produce a product matrix. The operation method includes the following steps. A plurality of first calculation circuits produce a plurality of first multiply-accumulate values in a first column of the product matrix. A control circuit receives a plurality of first element values in a column of the first matrix during a first period. The control circuit classifies the first element values into at least one first classification value. When a first classification quantity of the at least one first classification value is less than or equal to a first classification threshold, the control circuit controls the first calculation circuits to operate in a low power mode, and when the first classification quantity is greater than the first classification threshold the control circuit controls the first calculation circuits to operate in a normal mode. A multiplication circuit respectively multiplies the at least one first classification value by a second element value in a row of the second matrix in the low power mode to obtain at least one first product value. A routing circuit transmits each of the at least one first product value to at least one corresponding calculation circuit in the first calculation circuits in the low power mode.

An embodiment of the invention provides a matrix multiplication device. The matrix multiplication device may multiply a first matrix by a second matrix to produce a product matrix. The matrix multiplication device includes a plurality of calculation circuits, a control circuit, and a routing circuit. The calculation circuits are configured to produce a plurality of first multiply-accumulate values in a first column of the product matrix, where the calculation circuits include at least one first calculation circuit and at least one second calculation circuit. The control circuit is configured to receive a plurality of first element values in a column of the first matrix during a first period. The control circuit classifies the first element values into at least one first classification value. When a first classification quantity of the at least one first classification value is less than or equal to a first classification threshold, the control circuit controls the calculation circuits to operate in a low power mode. The at least one first calculation circuit respectively multiplies the at least one first classification value by second element values in a first column of the second matrix in the low power mode to obtain at least one first product value. The routing circuit is coupled to the at least one first calculation circuit to receive the at least one first product value. The routing circuit transmits each of the at least one first product value to at least one corresponding calculation circuit in the calculation circuits in the low power mode. When a first classification quantity is greater than a first classification threshold, the control circuit controls the calculation circuits to operate in a normal mode.

Based on the above, the matrix multiplication device in the embodiments of the invention may multiply the first matrix by the second matrix to produce the product matrix. The matrix multiplication device receives a plurality of first element values in a column of the first matrix during a first period, and receives at least one second element value in a row of the second matrix. The control circuit classifies the first element values into at least one first classification value, and then the multiplication circuit respectively multiplies the first classification value by the second element value. Therefore, a repeated multiplication operation performed on the first element values with the same value can be effectively reduced.

To make the features and advantages of the invention clear and easy to understand, the following gives a detailed description of embodiments with reference to accompanying drawings.

DESCRIPTION OF THE EMBODIMENTS

Figure 1:
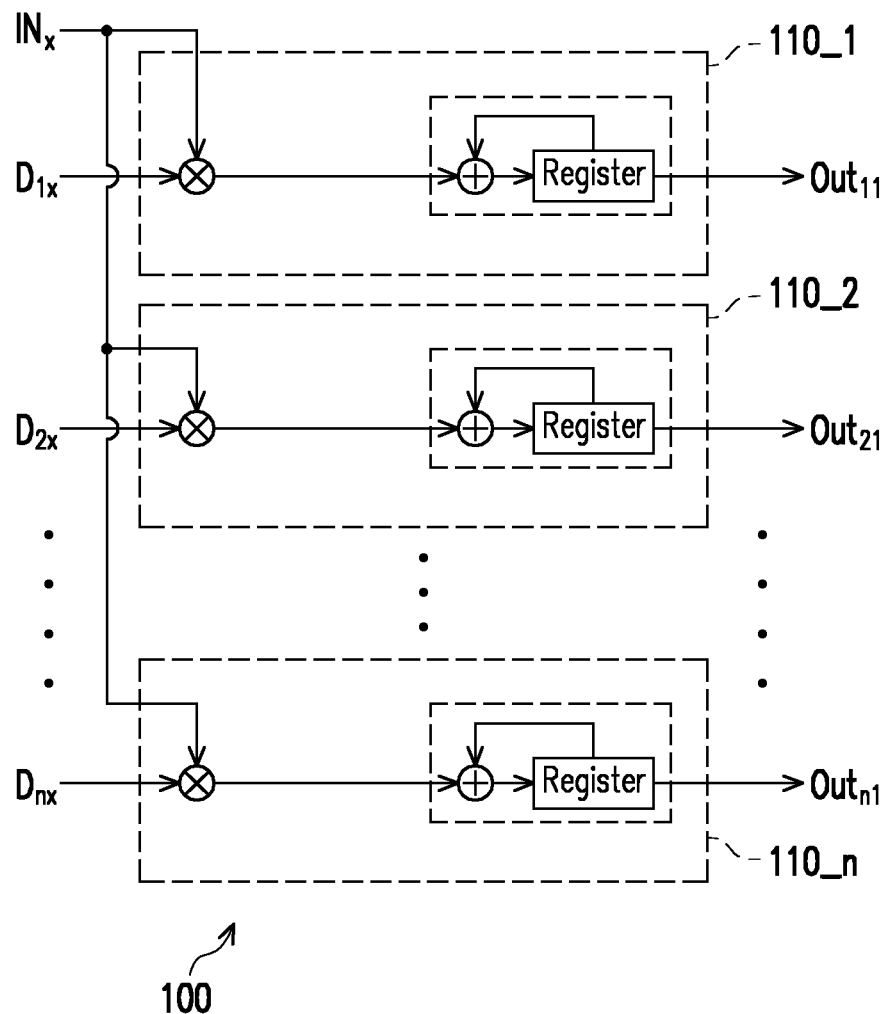
FIG. 1 is a schematic diagram of a circuit block of a matrix multiplication device.

The term "couple (or connect)" used in the entire specification (including the claims) may mean any direct or indirect connection means. For example, a first device coupled (connected) to a second device described herein should be interpreted as that the first device may be directly connected to the second device, or that the first device may be indirectly connected to the second device by other devices or by some means of connection. Terms such as "first" and "second" used in the entire specification (including the claims) are used to name elements or to distinguish between different embodiments or ranges, and are not intended to define the upper or lower limit of the quantity of elements or to limit the order of elements. Wherever possible, the same reference numbers are used in the drawings and the description to refer to the same or like elements, components or steps. For elements, components or steps denoted by same reference numbers or names, reference can be made to the related descriptions.

In a neural network operation, a matrix multiplication operation, that is, a multiply-accumulate (MAC) operation, is often required. For example, a matrix multiplication device may need to calculate Equation 1 below for the neural network operation.

$$\begin{bmatrix} D_{11} & \cdots & D_{1m} \\ \vdots & \ddots & \vdots \\ D_{n1} & \cdots & D_{nm} \end{bmatrix} \times \begin{bmatrix} In_1 \\ In_2 \\ \vdots \\ In_m \end{bmatrix} = \begin{bmatrix} \sum_{k=1}^{m} D_{1k} \times In_k \\ \sum_{k=1}^{m} D_{2k} \times In_k \\ \vdots \\ \sum_{k=1}^{m} D_{nk} \times In_k \end{bmatrix} = \begin{bmatrix} Out_{11} \\ Out_{21} \\ \vdots \\ Out_{n1} \end{bmatrix} \quad \text{(Equation 1)}$$

FIG. 1 is a schematic diagram of a circuit block of a matrix multiplication device 100. The matrix multiplication device 100 may multiply a first matrix by a second matrix to produce a product matrix. The matrix multiplication device 100 shown in FIG. 1 has a plurality of calculation circuits 110_1, 110_2, ..., 110_n. The calculation circuits 110_1 to 110_n may disassemble multiplication of the first matrix by the second matrix to produce a plurality of multiply-accumulate values of the product matrix. In each stage, the calculation circuits 110_1 to 110_n may take an element value Inx of the second matrix and element values $D_{1x}$, $D_{2x}$, ..., $D_{nx}$ of a column in the first matrix respectively to perform a multiply-accumulate (MAC) operation. For example, referring to FIG. 1 and Equation 1, in a first period (first stage), the calculation circuits 110_1 to 110_n may take an element value $In_1$ of the second matrix and multiply the element value by element values $D_{11}$ to $D_{n1}$ of a first column in the first matrix respectively, and then store product values (as multiply-accumulate values) into corresponding registers. In a second period (second stage), the calculation circuits 110_1 to 110_n may take the element value $In_2$ of the second matrix and multiply the element value by element values $D_{12}$ to $D_{n2}$ of a second column in the first matrix respectively, then respectively add product values to the previous multiply-accumulate values to obtain new multiply-accumulate values, and store the new multiply-accumulate value back into corresponding registers. The rest is deduced by analogy until the multiply-accumulate operation in the $m^{th}$ period ($m^{th}$ stage) is completed. After the multiply-accumulate operation in the $m^{th}$ period is completed, the calculation circuits 110_1 to 110_n may respectively supply a plurality of multiply-accumulate values $Out_{11}$, $Out_{21}$, ..., $Out_{n1}$ of the product matrix from the corresponding register.

In fact, in many applications (such as a neural network, etc.), compression, quantization, and/or other processing may be usually performed on element values $D_{11}$ to $D_{nm}$ of the matrix, and therefore a number of values of element values $D_{1x}$ to $D_{nx}$ in the $x^{th}$ stage may be less than a number of values of the element values $D_{1x}$ to $D_{nx}$. That is, the element values $D_{1x}$ to $D_{nx}$ often have values that are repeated. The multiplication operation performed on the repeated element values is also repeated. For example, assuming that the element values $D_{1x}$ to $D_{nx}$ are 2, 2, 3, 3, 2, 2, 4, 4 respectively, the element value Inx is 10. The calculation circuits 110_1 to 110_n respectively perform multiplication operations [2*10], [2*10], [3*10], [3*10], [2*10], [2*10], [4*10], [4*10] for the element values $D_{1x}$ to $D_{nx}$ in the $x^{th}$ period ($x^{th}$ stage). As can be seen from this example, the multiplication operation [2*10] is repeated four times, the multiplication operation [3*10] is repeated twice, and the multiplication operation [4*10] is repeated twice. Since the power consumption of multiplication operation is extremely large, a number of times of such operation is preferably to be reduced.

Herein, it is assumed that the element values $D_{1x}$ to $D_{nx}$ have k classification values, where k<n, and k and n are integers. For example, assuming that the element values $D_{1x}$ to $D_{nx}$ are 2, 2, 3, 3, 2, 2, 4, 4 respectively, because the element values $D_{1x}$ to $D_{nx}$ may be classified into three classification values (that is, 2, 3, and 4), k is 3 (that is, the element values $D_{1x}$ to $D_{nx}$ have three classification values). Under this condition, if the n multiplication operations originally required are reduced to k multiplication operations, the (n-k) multiplication operations may be reduced, thereby reducing power consumption.

Figure 2:
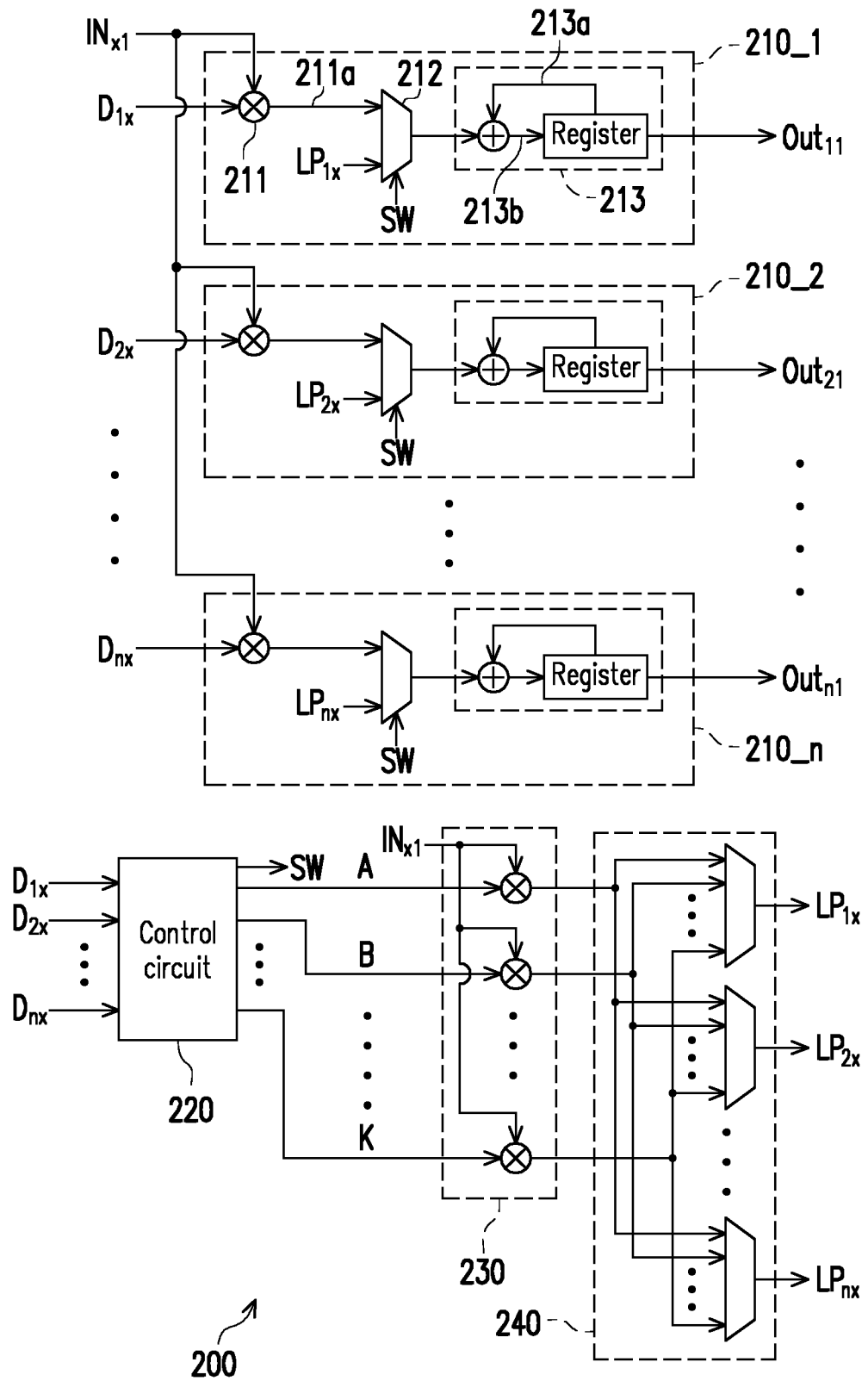
FIG. 2 is a schematic diagram of a circuit block of a matrix multiplication device according to an embodiment of the invention.

FIG. 2 is a schematic diagram of a circuit block of a matrix multiplication device 200 according to an embodiment of the invention. The matrix multiplication device 200 may multiply a first matrix by a second matrix to produce a product matrix. For example, the matrix multiplication device 200 may calculate Equation 2 below. If the second matrix is a one-dimensional matrix, Equation 2 may be rewritten as Equation 3.

$$\begin{bmatrix} D_{11} & \cdots & D_{1m} \\ \vdots & \ddots & \vdots \\ D_{n1} & \cdots & D_{nm} \end{bmatrix} \times \begin{bmatrix} In_{11} & \cdots & In_{1t} \\ \vdots & \ddots & \vdots \\ In_{m1} & \cdots & In_{mt} \end{bmatrix} = \begin{bmatrix} Out_{11} & \cdots & Out_{1t} \\ \vdots & \ddots & \vdots \\ Out_{n1} & \cdots & Out_{nt} \end{bmatrix} \quad \text{(Equation 2)}$$

-continued $$\begin{bmatrix} D_{11} & \cdots & D_{1m} \\ \vdots & \ddots & \vdots \\ D_{n1} & \cdots & D_{nm} \end{bmatrix} \times \begin{bmatrix} In_{11} \\ In_{21} \\ \vdots \\ In_{m1} \end{bmatrix} = \begin{bmatrix} Out_{11} \\ Out_{21} \\ \vdots \\ Out_{n1} \end{bmatrix} \quad \text{(Equation 3)}$$

In the embodiment shown in FIG. 2, the matrix multiplication device 200 includes a plurality of calculation circuits 210_1, 210_2, . . . , 210_n. The matrix multiplication device 200 further includes a control circuit 220, a multiplication circuit 230, and a routing circuit 240. When the calculation circuits 210_1 to 210_n operate in a normal mode, the calculation circuits 210_1 to 210_n may disassemble multiplication of the first matrix by the second matrix to produce a plurality of multiply-accumulate values of the product matrix. The calculation circuit 210_1 includes a multiplier 211, a multiplexer 212, and an accumulation circuit 213. The remaining calculation circuits 210_2 to 210_n may be analogized with reference to the related description of the calculation circuit 210_1, and the descriptions thereof are omitted herein.

In the calculation circuit 210_1, the multiplier 211 may receive a corresponding element value $D_{1x}$ in the element values $D_{1x}$ to $D_{nx}$ of an $x^{th}$ column of the first matrix in an $x^{th}$ period (stage). The multiplier 211 multiplies the corresponding element value $D_{1x}$ by a corresponding element value $IN_{x1}$ in element values of an $x^{th}$ row of the second matrix in a normal mode, to obtain a product value 211a. The multiplexer 212 is coupled to the multiplier 211 to receive the product value 211a. The multiplexer 212 is coupled to the routing circuit 240 to receive a corresponding product value $LP_{1x}$. The multiplexer selects the product value 211a as an accumulation object in the normal mode and outputs the product value to the accumulation circuit 213. The multiplexer 212 selects the corresponding product value $LP_{1x}$ as an accumulation target in a low power mode and outputs the product value to the accumulation circuit 213. The accumulation circuit 213 is coupled to the multiplexer 212 to receive the accumulation object. The accumulation circuit 213 may add the accumulation object to the previous corresponding multiply-accumulate value 213a to obtain a new corresponding multiply-accumulate value 213b, and store the new corresponding multiply-accumulate value 213b back into a corresponding register. Upon completion of the multiply-accumulate operation of m times, the accumulation circuit 213 may supply a multiply-accumulate value $Out_{11}$ of the product matrix from the corresponding register.

Therefore, in the normal mode, the calculation circuits 210_1 to 210_n may take an element value $In_{x1}$ of the second matrix and each element value $D_{1x}$ to $D_{nx}$ of a column in the first matrix in each stage to perform a multiply-accumulate (MAC) operation respectively. For example, referring to FIG. 2 and Equation 3 (Equation 2), in a first period (first stage), the calculation circuits 210_1 to 210_n may take an element value $In_{11}$ of the second matrix and multiply the element value by element values $D_{11}$ to $D_{n1}$ of a first column in the first matrix respectively, and then store product values (as multiply-accumulate values) into a corresponding accumulation circuit. In a second period (second stage), the calculation circuits 210_1 to 210_n may take the element value $In_{21}$ of the second matrix and multiply the element value by element values $D_{12}$ to $D_{n2}$ of a second column in the first matrix respectively, then respectively add product values to the previous multiply-accumulate values to obtain new multiply-accumulate values, and store the new multiply-accumulate values back into a corresponding accumulation circuit. The rest is deduced by analogy until the multiply-accumulate operation in the $m^{th}$ period ($m^{th}$ stage) is completed. After the multiply-accumulate operation in the $m^{th}$ period is completed, the accumulation circuits of the calculation circuits 210_1 to 210_n may respectively supply a plurality of multiply-accumulate values $Out_{11}$, $Out_{21}$, . . . , $Out_{n1}$ in a first column of the product matrix.

Figure 3:
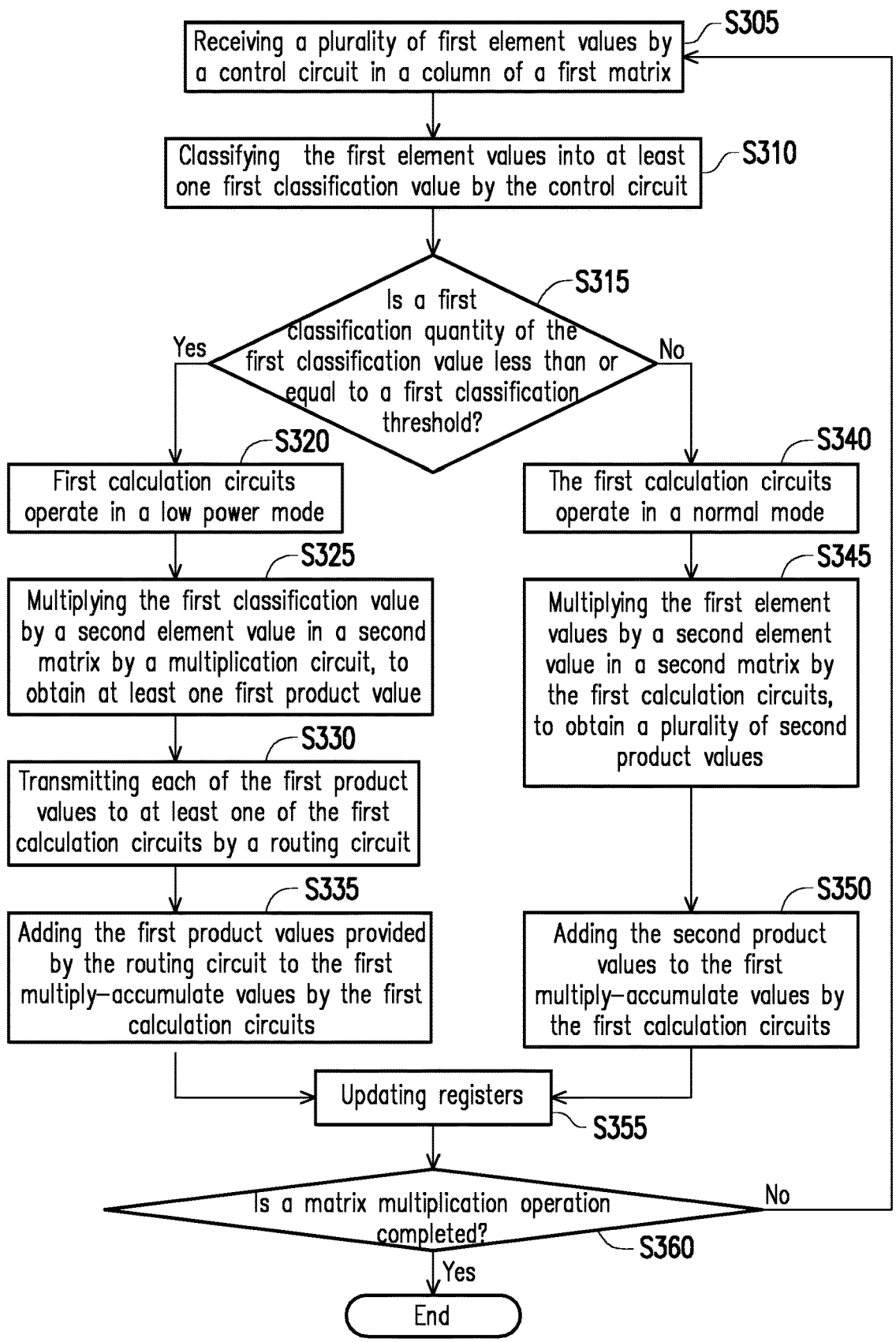
FIG. 3 is a schematic flowchart illustrating an operation method of a matrix multiplication device according to an embodiment of the invention.

FIG. 3 is a schematic flowchart illustrating an operation method of a matrix multiplication device according to an embodiment of the invention. With reference to FIG. 2 and FIG. 3, a control circuit 220 may receive element values $D_{1x}$ to $D_{nx}$ of an $x^{th}$ column of the first matrix in an $x^{th}$ period (step S305). The control circuit 220 may classify the element values $D_{1x}$ to $D_{nx}$ into at least one classification value (step S310). For example (but not limited thereto), the control circuit 220 may classify the element values $D_{1x}$ to $D_{nx}$ into classification values A, B, . . . , K. When a number of the classification values is less than or equal to a preset classification threshold (a determining result of step S315 is yes), the control circuit 220 may control, via switching a signal SW, the calculation circuits 210_1 to 210_n to operate in a low power mode (step S320). The classification threshold may be determined according to design requirements. Multipliers (for example, a multiplier 211) of the calculation circuits 210_1 to 210_n may be disabled in the low power mode to reduce power consumption.

For example, assuming that the classification threshold is 3, and the element values $D_{1x}$ to $D_{nx}$ are respectively 2, 2, 3, 3, 2, 2, 4, 4 in the $x^{th}$ period, the control circuit 220 may classify the element values $D_{1x}$ to $D_{nx}$ into three classification values (that is 2, 3, and 4). Because a number of the classification values is less than or equal to a preset classification threshold, the control circuit 220 may control the calculation circuits 210_1 to 210_n to operate in the low power mode in the $x^{th}$ period (stage).

The multiplication circuit 230 may respectively multiply the at least one classification value (for example, the classification values A to K) by an element value $IN_{x1}$ in the $x^{th}$ row of a second matrix in the low power mode, and output product values to the routing circuit 240 (step S325). In the embodiment shown in FIG. 2, the multiplication circuit 230 includes at least one multiplier. A multiplier of the multiplication circuit 230 may respectively multiply the at least one classification value (for example, the classification values A to K) by the element value $IN_{x1}$ in the second matrix in the low power mode, to obtain product values. The routing circuit 240 is coupled to the multiplication circuit 230 to receive the product values. The routing circuit 240 transmits each of the product values to at least one corresponding calculation circuit in the calculation circuits 210_1 to 210_n in the low power mode (step S330). In the embodiment shown in FIG. 2, the routing circuit 240 includes a plurality of multiplexers, the multiplexers being coupled to the multiplier of the multiplication circuit 230 to receive the product values, and an output terminal of each of the multiplexers being coupled to one corresponding calculation circuit in the calculation circuits 210_1 to 210_n, to provide one corresponding product value in the product values $LP_{1x}$, $LP_{2x}$, . . . , $LP_{nx}$.

For example, assuming that the element values $D_{1x}$ to $D_{nx}$ in the $x^{th}$ period are respectively 2, 2, 3, 3, 2, 2, 4, 4, the control circuit 220 may classify the element values $D_{1x}$ to $D_{nx}$ into classification values [2], [3], [4]. In the low power mode, the multiplication circuit 230 may respectively multiply the classification values [2], [3], [4] by the element value $IN_{x1}$ of the second matrix in the $x^{th}$ period, and output product values of $[2*IN_{x1}]$, $[3*IN_{x1}]$, $[4*IN_{x1}]$ to the routing circuit 240. The routing circuit 240 may use the product value $[2*IN_{x1}]$ as the product value $LP_{1x}$, the product value $LP_{2x}$, the product value $LP_{5x}$, and the product value $LP_{6x}$ to be transmitted to the calculation circuits 210_1, 210_2, 210_5, and 210_6, use the product value $[3*IN_{x1}]$ as the product value $LP_{3x}$ and the product value $LP_{4x}$ to be transmitted to the calculation circuits 210_3 and 210_4 and use the product value $[4*IN_{x1}]$ as the product value $LP_{7x}$ and the product value $LP_{8x}$ to be transmitted to the calculation circuits 210_7 and 210_8. In the low power mode, the multiplication circuit 230 performs a multiplication operation using three multipliers, while the remaining multipliers (multipliers including the calculation circuits 210_1 to 210_n) are disabled. Therefore, eight multiplication operations that are originally required are reduced to three multiplication operations, thereby reducing power consumption.

Based on switching operations of the multiplexers (for example, the multiplexer 212) of the calculation circuits 210_1 to 210_n, the accumulation circuits (for example, the accumulation circuit 213) of the calculation circuits 210_1 to 210_n may respectively add the product values $LP_{1x}$ to $LP_{nx}$ provided by the routing circuit 240 to the previous multiply-accumulate values to obtain new multiply-accumulate values (step S335), and store the new multiply-accumulate values back into the corresponding accumulation circuit (step S355, that is, the new multiply-accumulate values are updated to the registers).

When a number of the classification values is greater than a preset classification threshold (a determining result of step S315 is no), the control circuit 220 may control, via switching a signal SW, the calculation circuits 210_1 to 210_n to operate in a normal mode (step S340). In the normal mode, the multipliers of the multiplication circuit 230 may be disabled to reduce power consumption. The calculation circuits 210_1 to 210_n may receive element values $D_{1x}$ to $D_{nx}$ of an $x^{th}$ column of the first matrix in an $x^{th}$ period (stage). In step S345, the calculation circuits 210_1 to 210_n may respectively multiply the element values $D_{1x}$ to $D_{nx}$ by one element value $IN_{x1}$ in the $x^{th}$ row of the second matrix in the normal mode to obtain a plurality of product values (for example, a product value 211a). The calculation circuits 210_1 to 210_n may respectively add the product values to the previous multiply-accumulate values in the normal mode (step S350), and store the new multiply-accumulate values back into the corresponding accumulation circuit (step S355, that is, the new multiply-accumulate values are updated to the registers).

Upon completion of step S355, the control circuit 220 may determine whether the matrix multiplication operation (for example, an operation of Equation 2 or Equation 3) is completed. If the matrix multiplication operation has not been completed (a determining result of step S360 is no), the process returns to step S305. In step S305, the control circuit 220 may receive element values in a next column of the first matrix in a next period (stage). When the matrix multiplication operation has been completed (a determining result of step S360 is yes), the accumulation circuits (for example, the accumulation circuit 213) of the calculation circuits 210_1 to 210_n may respectively produce/provide a plurality of multiply-accumulate values $Out_{11}$, $Out_{21}$, ..., $Out_{n1}$ in the first column of the product matrix.

Based on the foregoing, the control circuit 220 may adjust a number of multipliers for use according to a number of classification of the element values $D_{1x}$ to $D_{nx}$, thereby reducing power consumption. According to the design requirements, a determining mechanism of control circuit 220 may be on the fly, offline, or any combination thereof. The determining mechanism may be made by input data, bitstream or pre-designed control signals directly or indirectly.

An example of the operation of the matrix multiplication device 200 is described below. Herein, it is assumed that the matrix multiplication device 200 calculates Equation 4 below. The matrix multiplication device 200 receives the element values of the first matrix in the first column, second column, and third column in the periods T1, T2, and T3 (stages) respectively. Table 1 below is an example of the operation in which the matrix multiplication device 200 performs mode switching in different periods. In the example shown in Table 1, [X] means [don't care].

$$\begin{bmatrix} 2 & 2 & 3 \\ 2 & 1 & 3 \\ 3 & 3 & 2 \\ 3 & 2 & 2 \\ 2 & 4 & 4 \\ 2 & 5 & 4 \\ 4 & 6 & 4 \\ 4 & 7 & 4 \end{bmatrix} \times \begin{bmatrix} 10 \\ 11 \\ 12 \end{bmatrix} = \begin{bmatrix} Out_{11} \\ Out_{21} \\ Out_{31} \end{bmatrix} \quad \text{(Equation 4)}$$

TABLE 1

Example of the operation in which the matrix multiplication device performs mode switching in different periods

| Period | | $T_1$ | $T_2$ | $T_3$ |
|---|---|---|---|---|
| $D_{1x}$-$D_{nx}$ | | 2, 2, 3, 3, 2, 2, 4, 4 | 2, 1, 3, 2, 4, 5, 6, 7 | 3, 3, 2, 2, 4, 4, 4, 4 |
| Number of Classification | | 3 | 7 | 3 |
| $IN_{x1}$ | | 10 | 11 | 12 |
| Multiplier of 230 | In | 2, 3, 4 | X | 3, 2, 4 |
|  | Out | 20, 30, 40 | X | 36, 24, 48 |
| Multipliers of 210_1 to 210_n | In | X | 2, 1, 3, 2, 4, 5, 6, 7 | X |
|  | Out | X | 22, 11, 33, 22, 44, 55, 66, 77 | X |
| SW | | Low power mode | Normal mode | Low power mode |

With reference to FIG. 2 and Table 1, in the example shown in Table. 1, it is assumed that the multiplication circuit 230 is configured with three multipliers. In the $T_1$ period, the element values $D_{1x}$ to $D_{nx}$ are 2, 2, 3, 3, 2, 2, 4, 4. The control circuit 220 may classify the element values $D_{1x}$ to $D_{nx}$ into three classification values [2], [3], [4]. Because the number of classification values are three (less than or equal to a preset classification threshold [3]), the control circuit 220 may control, via switching the signal SW, the calculation circuits 210_1 to 210_n to operate in the low power mode in the $T_1$ period (stage). The multiplication circuit 230 may respectively multiply the classification values [2], [3], [4] by the element value 10, and output product values of [2*10=20], [3*10=30], [4*10=40] to the routing circuit 240.

In the $T_2$ period (stage), the element values $D_{1x}$ to $D_{nx}$ are 2, 1, 3, 2, 4, 5, 6, 7. The control circuit 220 may classify the element values $D_{1x}$ to $D_{nx}$ into seven classification values [1], [2], [3], [4], [5], [6], [7]. Because the number of classification values are seven (greater than a preset classification threshold [3]), the control circuit 220 may control, via switching the signal SW, the calculation circuits 210_1 to 210_n to operate in a normal mode in the $T_2$ period (stage). The calculation circuits 210_1 to 210_n may respectively multiply the element values $D_{1x}$ to $D_{nx}$ by the element value 11 to produce product values of [2*11=22], [1*11=11], [3*11=33], [2*11=22], [4*11=44], [5*11=55], [6*11=66], [7*11=77].

In the $T_3$ period (stage), the element values $D_{1x}$ to $D_{nx}$ are 3, 3, 2, 2, 4, 4, 4, 4. The control circuit 220 may classify the element values $D_{1x}$ to $D_{nx}$ into three classification values [2], [3], [4]. Because the number of classification values are three (less than or equal to a preset classification threshold [3]), the control circuit 220 may control, via switching the signal SW, the calculation circuits 210_1 to 210_n to operate in the low power mode in the $T_3$ period (stage). The multiplication circuit 230 may respectively multiply the classification values [2], [3], [4] by the element value 12, and output product values of [2*12=24], [3*12=36], [4*12=48] to the routing circuit 240.

In the example shown in Table 1, the multiplication circuit 230 can be started during the T1 and T3 periods (stages), and the multipliers of 210_1 to 210_n are disabled, causing the multipliers for the multiplication operation to be reduced from 8 to 3. Therefore, the matrix multiplication device 200 can reduce energy consumption of 10 multiplication operations.

Figure 4:
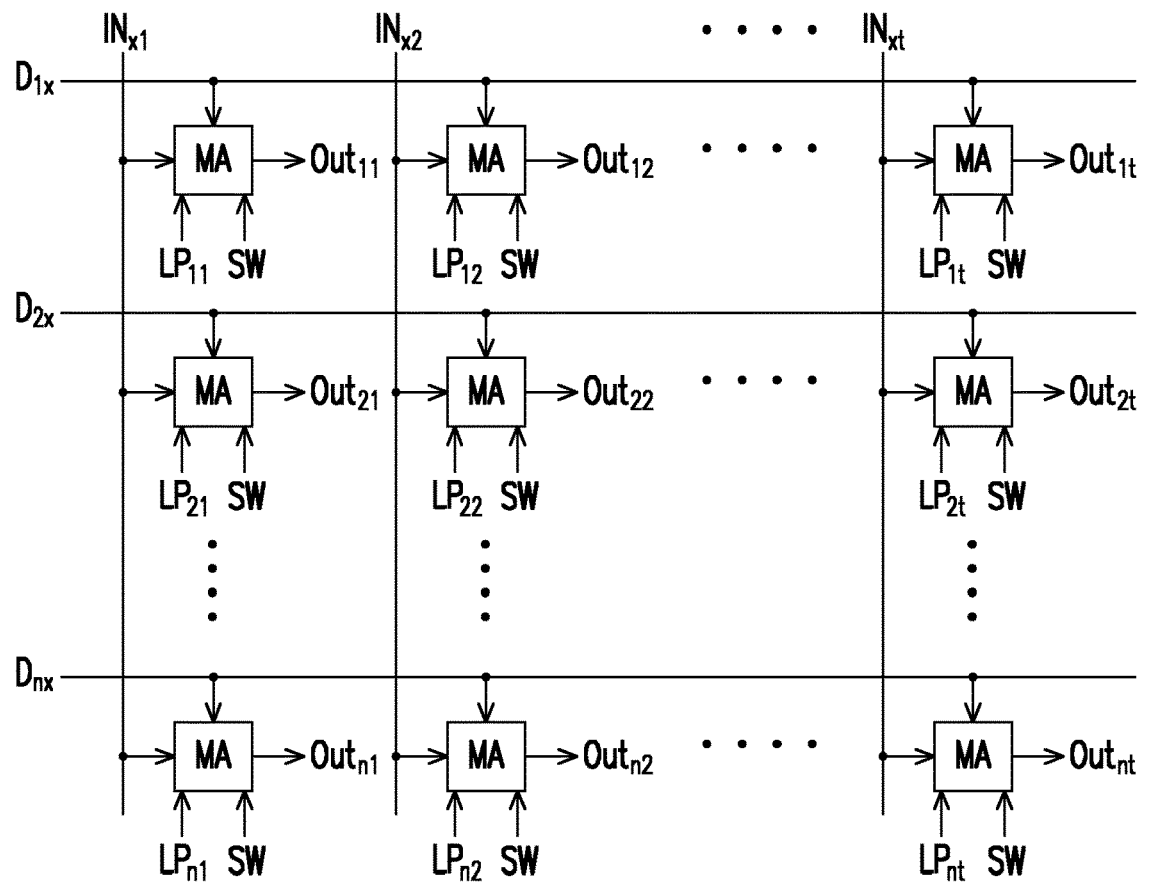
FIG. 4 is a schematic diagram of a circuit block of a matrix multiplication device according to another embodiment of the invention.
Figure 4:
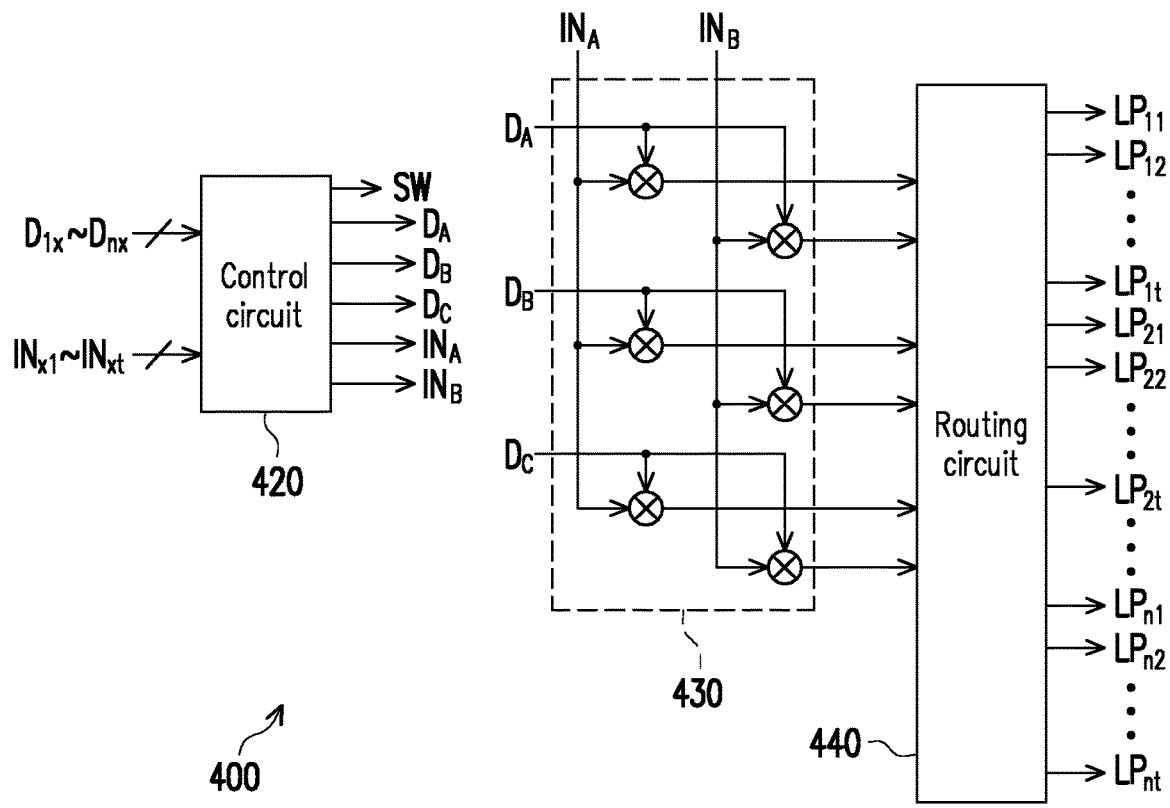

FIG. 4 is a schematic diagram of a circuit block of a matrix multiplication device 400 according to another embodiment of the invention. The matrix multiplication device 400 may calculate Equation 2 above, that is, multiply a first matrix by a second matrix to produce a product matrix. In the embodiment shown in FIG. 4, the matrix multiplication device 400 includes a plurality of calculation circuits MA. Each of the calculation circuits MA shown in FIG. 4 may be analogized with reference to the related description of the calculation circuit 210_1 shown in FIG. 2, and the descriptions thereof are omitted herein.

The matrix multiplication device 400 further includes a control circuit 420, a multiplication circuit 430, and a routing circuit 440. The control circuit 420 shown in FIG. 4 may be analogized with reference to the related description of the control circuit 220 shown in FIG. 2. The control circuit 420 may receive element values $D_{1x}$ to $D_{nx}$ in an $x^{th}$ column of a first matrix in an $x^{th}$ period (stage), and receive element values $IN_{x1}$ to $IN_{xt}$ in an $x^{th}$ row of a second matrix. The control circuit 420 may classify the element values $D_{1x}$ to $D_{nx}$ into at least one first classification value, and classify the element values $IN_{x1}$ to $IN_{xt}$ into at least one second classification value. For example (but not limited thereto), the control circuit 420 may classify the element values $D_{1x}$ to $D_{nx}$ into first classification values $D_A$, $D_B$, $D_C$, and the control circuit 420 may classify the element values $IN_{x1}$ to $IN_{xt}$ into second classification values $IN_A$ and $IN_B$.

When a number of the first classification values is less than or equal to a preset first classification threshold (for example, a first classification threshold is 3), and when a number of the second classification values is less than or equal to a preset second classification threshold (for example, a second classification threshold is 2), the control circuit 420 may control, via switching a signal SW, the calculation circuits MA to operate in the low power mode. The first classification threshold and the second classification threshold may be determined according to design requirements. Multipliers (for example, a multiplier 211) of the calculation circuits MA may be disabled in the low power mode to reduce power consumption.

The multiplication circuit 430 shown in FIG. 4 may be analogized with reference to the related description of the multiplication circuit 230 shown in FIG. 2. The multiplication circuit 430 may multiply any of the first classification values $D_A$, $D_B$, $D_C$ by any of the second classification values $IN_A$, $IN_B$ in the low power mode, and output the product values of $[D_A*IN_A]$, $[D_A*IN_B]$, $[D_B*IN_A]$, $[D_B*IN_B]$, $[D_C*IN_A]$, $[D_C*IN_B]$ to the routing circuit 440. The routing circuit 440 is coupled to the multiplication circuit 430 to receive the product values. The routing circuit 440 shown in FIG. 4 may be analogized with reference to the related description of the routing circuit 240 shown in FIG. 2. The routing circuit transmits each of the product values of the multiplication circuit 430 to at least one corresponding calculation circuit in the calculation circuits MA in the low power mode. In the embodiment shown in FIG. 4, an output terminal of the routing circuit 440 is coupled to one corresponding calculation circuit in the calculation circuits MA, to provide one corresponding product value in the product values $LP_{11}$, $LP_{12}$, ..., $LP_{1t}$, $LP_{21}$, $LP_{22}$, ..., $LP_{2t}$, ..., $LP_{n1}$, $LP_{n2}$, ..., $LP_{nt}$.

Based on switching operations of the multiplexers (for example, the multiplexer 212) of the calculation circuits MA, the accumulation circuits (for example, the accumulation circuit 213) of the calculation circuits MA may respectively add the product values $LP_{1x}$ to $LP_{nx}$ provided by the routing circuit 440 to the previous multiply-accumulate values to obtain new multiply-accumulate values, and store the new multiply-accumulate values back into the corresponding accumulation circuit. Therefore, the accumulation circuits of the calculation circuits MA may respectively produce/provide a plurality of multiply-accumulate values $Out_{11}$, $Out_{12}$, ..., $Out_{1t}$, $Out_{21}$, $Out_{22}$, ..., $Out_{2t}$, ..., $Out_{n1}$, $Out_{n2}$, ..., $Out_{nt}$ in the product matrix.

When a number of the first classification values is greater than a preset first classification threshold (for example, a first classification threshold is 3), or when a number of the second classification values is greater than a preset second classification threshold (for example, a second classification threshold is 2), the control circuit 420 may control, via switching a signal SW, the calculation circuits MA to operate in the normal mode. In the normal mode, the multipliers of the multiplication circuit 430 may be disabled to reduce power consumption. The calculation circuits MA may receive element values $D_{1x}$ to $D_{nx}$ in an $x^{th}$ column of a first matrix in an $x^{th}$ period (stage), and receive element values $IN_{x1}$ to $IN_{xt}$ in an $x^{th}$ row of a second matrix. The calculation circuits MA may multiply any of the element values $D_{1x}$ to $D_{nx}$ by a corresponding element value of the element values $IN_{x1}$ to $IN_{xt}$ in the normal mode, to obtain a plurality of product values (for example, the product value 211a). The calculation circuits MA may respectively add the product values to the previous multiply-accumulate values in the normal mode to obtain new multiply-accumulate values, and store the new multiply-accumulate values back into a corresponding accumulation circuit. Therefore, the accumulation circuits (for example, the accumulation circuit 213) of the calculation circuits MA may respectively produce/provide a plurality of multiply-accumulate values $Out_{11}$ to $Out_{nt}$ in the product matrix.

Figure 5:
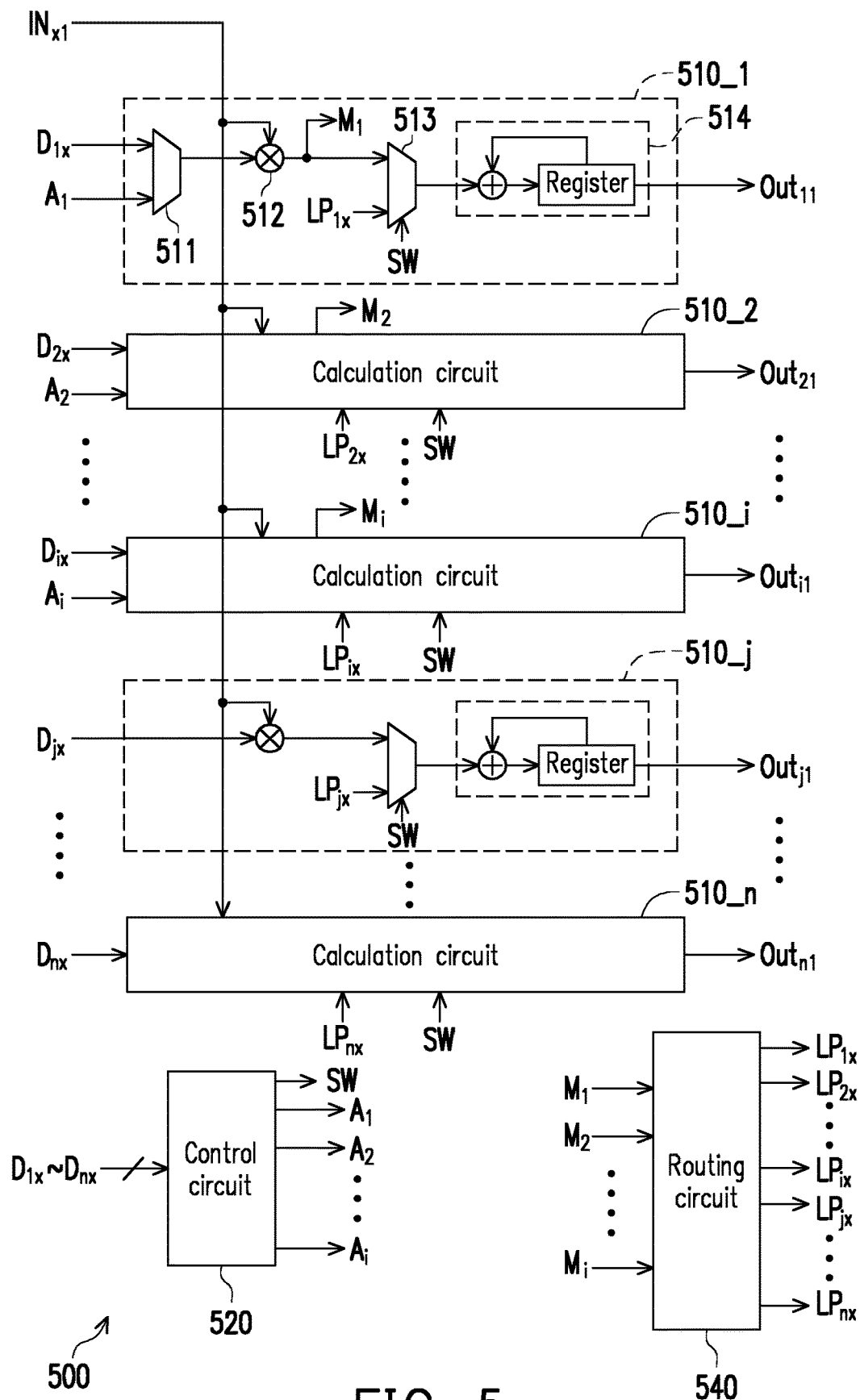
FIG. 5 is a schematic diagram of a circuit block of a matrix multiplication device according to still another embodiment of the invention.

FIG. 5 is a schematic diagram of a circuit block of a matrix multiplication device 500 according to another embodiment of the invention. The matrix multiplication device 500 may multiply a first matrix by a second matrix to produce a product matrix. For example, the matrix multiplication device 500 may calculate Equation 3 above. The matrix multiplication device 500 includes a control circuit 520 and a routing circuit 540. The control circuit 520 and the routing circuit 540 shown in FIG. 5 may be analogized with reference to the related descriptions of the control circuit 220 and the routing circuit 240 shown in FIG. 2. In the embodiment shown in FIG. 5, the matrix multiplication device 500 further includes a plurality of calculation circuits to produce a plurality of multiply-accumulate values $Out_{11}$ to $Out_{n1}$ in the first column of the product matrix. The calculation circuits include at least one first calculation circuit (for example, 510_1, 510_2, ..., 510_$i$) and at least one second calculation circuit (for example, 510_$j$, ..., 510_$n$). Each of the second calculation circuits 510_$j$ to 510_$n$ shown in FIG. 5 may be analogized with reference to the related description of the calculation circuit 210_1 shown in FIG. 2, and the descriptions thereof are omitted herein.

The first calculation circuits 510_2 to 510_$i$ shown in FIG. 5 may be analogized with reference to the related description of the first calculation circuit 510_1 shown in FIG. 5. The first calculation circuit 510_1 includes a multiplexer 511, a multiplier 512, a multiplexer 513, and an accumulation circuit 514. A first selection terminal of the multiplexer 511 may receive a corresponding element value $D_{1x}$ in the element values $D_{1x}$ to $D_{nx}$ of the $x^{th}$ column of the first matrix during the $x^{th}$ period. A second selection terminal of the multiplexer 511 is coupled to the control circuit 520 to receive a corresponding classification value $A_1$ in the classification values $A_1$ to $A_i$. In the normal mode, the multiplexer 511 selects the corresponding element value $D_{1x}$ as a multiplication object and outputs the element value to the multiplier 512. In the low power mode, the multiplexer 511 selects the corresponding classification value $A_1$ as a multiplication object and outputs the classification value to the multiplier 512.

The multiplier 512, the multiplexer 513, and the accumulation circuit 514 shown in FIG. 5 may be analogized with reference to the related descriptions of the multiplier 211, the multiplexer 212, and the accumulation circuit 213 shown in FIG. 2. The multiplier 512 is coupled to a common terminal of the multiplexer 511 to receive the multiplication object. The multiplier 512 may multiply the multiplication object output by the multiplexer 511 by one element value $IN_{x1}$ in the $x^{th}$ row in the second matrix to obtain a product $M_1$. The routing circuit 540 receives the product $M_1$ output by the multiplier 512 as one of the product values $LP_{1x}$, $LP_{2x}$, ..., $LP_{ix}$, $LP_{jx}$, ..., $LP_{nx}$ in the low power mode.

A first selection terminal of the multiplexer 513 is coupled to the multiplier 512 to receive the product $M_1$. A second selection terminal of the multiplexer 513 is coupled to the routing circuit 540 to receive a corresponding product value $LP_{1x}$ in the product values $LP_{1x}$ to $LP_{nx}$. In the normal mode, the multiplexer 513 selects the product $M_1$ as an accumulation object and outputs the product to the accumulation circuit 514. In the low power mode, the multiplexer 513 selects the corresponding product value $LP_{1x}$ as an accumulation object and outputs the product value to the accumulation circuit 514. The accumulation circuit 514 is coupled to a common terminal of the multiplexer 513 to receive the accumulation object. The accumulation circuit 514 adds the accumulation object to the corresponding multiply-accumulate value to obtain a new multiply-accumulate value, and store the new multiply-accumulate value back into the accumulation circuit 514.

The control circuit 520 is configured to receive a plurality of element values $D_{1x}$ to $D_{nx}$ in the $x^{th}$ column of the first matrix during the $x^{th}$ period. The control circuit 520 classifies the element values $D_{1x}$ to $D_{nx}$ into at least one classification value. When a number of the classification values is less than or equal to the classification threshold, the control circuit 520 may control, via switching a signal SW, the calculation circuits 510_1 to 510_$n$ to operate in the low power mode. The multipliers of the second calculation circuits 510_$j$ to 510_$n$ are disabled in the low power mode to reduce power consumption. In the low power mode, the first calculation circuits 510_1 to 510_$i$ respectively multiply the classification values (for example, the classification values $A_1$ to $A_i$) by one element value $IN_{x1}$ in the $x^{th}$ row of the second matrix to obtain product values $M_1$, $M_2$, ..., $M_i$.

The routing circuit 540 is coupled to the first calculation circuits 510_1 to 510_$i$ to receive the product values $M_1$ to $M_i$. In the low power mode, the routing circuit 540 may transmit each of the product values $M_1$ to $M_i$ to at least one corresponding calculation circuit in the calculation circuits 510_1 to 510_$n$. In the low power mode, the calculation circuits 510_1 to 510_$n$ respectively add the product values $M_1$-$M_i$ provided by the routing circuit 540 to the multiply-accumulate values. Therefore, accumulation circuits of the calculation circuits 510_1 to 510_$n$ may respectively produce/provide a plurality of multiply-accumulate values $Out_{11}$ to $Out_{n1}$ in the first column of the product matrix.

When a number of classification is greater than a classification threshold, the control circuit 520 controls the calculation circuits 510_1 to 510_$n$ to operate in the normal mode. The calculation circuits 510_1 to 510_$n$ may receive the element values $D_{1x}$ to $D_{nx}$ in the $x^{th}$ column of the first matrix during the $x^{th}$ period. In the normal mode, the calculation circuits 510_1 to 510_$n$ respectively multiply the element values $D_{1x}$ to $D_{nx}$ by one element value $IN_{x1}$ in the $x^{th}$ row of the second matrix, to obtain a plurality of product values. The calculation circuits 510_1 to 510_$n$ respectively add the product values to the corresponding multiply-accumulate values in the normal mode to obtain new multiply-accumulate values, and store the new multiply-accumulate values back into the accumulation circuit. Therefore, the accumulation circuits of the calculation circuits 510_1 to 510_$n$ may respectively produce/provide a plurality of multiply-accumulate values $Out_{11}$ to $Out_{n1}$ in the first column of the product matrix.

According to different design requirements, the implementation of blocks of the above calculation circuit, control circuit, multiplication circuit and/or routing circuit may be hardware, firmware, or a combination of the two.

In a form of hardware, the blocks of the above calculation circuit, control circuit, multiplication circuit and/or routing circuit may be implemented in a logic circuit on an integrated circuit. The related functions of the above calculation circuit, control circuit, multiplication circuit and/or routing circuit may be implemented as hardware by using hardware description languages (for example, Verilog HDL or VHDL) or other appropriate programming languages. For example, the related functions of the above calculation circuit, control circuit, multiplication circuit and/or routing circuit may be implemented in one or more controllers, a microcontroller, a microprocessor, an application-specific integrated circuit (ASIC), a digital signal processor (DSP), a field programmable gate array (FPGA) and/or various logic blocks, modules and circuits in other processing units.

In a form of firmware, the related functions of the above calculation circuit, control circuit, multiplication circuit and/or routing circuit may be implemented as programming codes. For example, the above calculation circuit, control circuit, multiplication circuit and/or routing circuit may be implemented by using general programming languages (for example, C, C++ or assembly language) or other appropriate programming languages. The programming codes may be recorded/stored in a recording medium, and the recording medium includes, for example, a read-only memory (ROM), a storage device and/or a random access memory (RAM). A computer, a central processing unit (CPU), a controller, a microcontroller, or a microprocessor can read and execute the programming codes from the recording medium to achieve the related functions. As the recording medium, a "non-transitory computer readable medium" may be used, for example, a tape, a disk, a card, a semiconductor memory, or a programmable logic circuit may be used. In addition, the program may alternatively be provided to the computer (or CPU) by any transmission medium (a communication network or broadcast wave). The communication network is, for example, the Internet, wired communication, wireless communication, or other communication media.

Based on the above, the matrix multiplication device in the embodiments of the invention may multiply the first matrix by the second matrix to produce the product matrix. The matrix multiplication device receives a plurality of first element values in the $x^{th}$ column of the first matrix during the $x^{th}$ period, and receives at least one second element value in the $x^{th}$ row of the second matrix. The control circuit classifies the first element values into at least one classification value, and then the multiplication circuit respectively multiplies the classification value by the second element value. Therefore, a repeated multiplication operation performed on the first element values with the same value can be effectively reduced.

Although the invention has been described with reference to the above embodiments, the embodiments are not intended to limit the invention. A person of ordinary skill in the art may make variations and improvements without departing from the spirit and scope of the invention. Therefore, the protection scope of the invention should be subject to the appended claims.

What is claimed is:

1. A matrix multiplication device configured to multiply a first matrix by a second matrix to produce a product matrix, the matrix multiplication device comprising:
    a plurality of first calculation circuits configured to produce a plurality of first multiply-accumulate values in a first column of the product matrix;
    a control circuit configured to receive a plurality of first element values in a column of the first matrix during a first period, wherein the control circuit classifies the first element values into at least one first classification value, the control circuit controls the first calculation circuits to operate in a low power mode when a first classification quantity of the at least one first classification value is less than or equal to a first classification threshold, and the control circuit controls the first calculation circuits to operate in a normal mode when the first classification quantity is greater than the first classification threshold;
    a multiplication circuit configured to respectively multiply the at least one first classification value by a second element value in a row of the second matrix in the low power mode to obtain at least one first product value; and
    a routing circuit coupled to the multiplication circuit to receive the at least one first product value, wherein the routing circuit transmits each of the at least one first product value to at least one corresponding calculation circuit in the first calculation circuits in the low power mode.

2. The matrix multiplication device according to claim 1, wherein the first calculation circuits are configured to receive the first element values in the column of the first matrix during the first period, the first calculation circuits respectively multiply the first element values by the second element value in the second matrix in the normal mode to obtain a plurality of second product values, and the first calculation circuits respectively add the second product values to the first multiply-accumulate values in the normal mode.

3. The matrix multiplication device according to claim 1, wherein in the low power mode, the first calculation circuits respectively add, to the first multiply-accumulate values, the at least one first product value provided by the routing circuit.

4. The matrix multiplication device according to claim 1, wherein any of the first calculation circuits comprises:
    a multiplier configured to receive a corresponding element value in the first element values during the first period, wherein the multiplier multiplies the corresponding element value by the second element value in the second matrix in the normal mode to obtain a second product value;
    a multiplexer coupled to the multiplier to receive the second product value and coupled to the routing circuit to receive a corresponding product value in the at least one first product value, wherein the multiplexer selects to output the second product value as an accumulation object in the normal mode, and the multiplexer selects to output the corresponding product value as the accumulation object in the low power mode; and
    an accumulation circuit coupled to the multiplexer to receive the accumulation object, wherein the accumulation circuit adds the accumulation object to a corresponding multiply-accumulate value in the first multiply-accumulate values.

5. The matrix multiplication device according to claim 4, wherein the multiplier is disabled in the low power mode to reduce power consumption.

6. The matrix multiplication device according to claim 1, wherein the multiplication circuit comprises:
    at least one multiplier configured to respectively multiply the at least one first classification value by the second element value in the second matrix in the low power mode to obtain the at least one first product value.

7. The matrix multiplication device according to claim 6, wherein the at least one multiplier is disabled in the normal mode to reduce power consumption.

8. The matrix multiplication device according to claim 6, wherein the routing circuit comprises:
    a plurality of multiplexers coupled to the at least one multiplier to receive the at least one first product value, wherein an output terminal of each of the multiplexers is coupled to a corresponding calculation circuit in the first calculation circuits to provide a corresponding product value in the at least one first product values.

9. The matrix multiplication device according to claim 1, further comprising:
    a plurality of second calculation circuits configured to produce a plurality of second multiply-accumulate values in a second column of the product matrix;
    wherein the control circuit is configured to receive a plurality of second element values in a row of the second matrix during the first period, the control circuit classifies the second element values into at least one second classification value, the control circuit controls the first calculation circuits and the second calculation circuits to operate in the low power mode when the first classification quantity is less than or equal to the first classification threshold and a second classification quantity of the at least one second classification value is less than or equal to a second classification threshold, and, the control circuit controls the first calculation circuits and the second calculation circuits to operate in the normal mode when the first classification quantity is greater than the first classification threshold or the second classification quantity is greater than the second classification threshold.

10. The matrix multiplication device according to claim 9, wherein the multiplication circuit multiplies any of the at least one first classification value by any of the at least one second classification value in the low power mode to obtain the at least one first product value.

11. An operation method of a matrix multiplication device, the matrix multiplication device being configured to multiply a first matrix by a second matrix to produce a product matrix, the operation method comprising:
producing, by a plurality of first calculation circuits, a plurality of first multiply-accumulate values in a first column of the product matrix;
receiving, by a control circuit, a plurality of first element values in a column of the first matrix during a first period;
classifying, by the control circuit, the first element values into at least one first classification value;
controlling, by the control circuit, the first calculation circuits to operate in a low power mode when a first classification quantity of the at least one first classification value is less than or equal to a first classification threshold;
controlling, by the control circuit, the first calculation circuits to operate in a normal mode when the first classification quantity is greater than the first classification threshold;
respectively multiplying, by a multiplication circuit, the at least one first classification value by a second element value in a row of the second matrix in the low power mode to obtain at least one first product value; and
transmitting, by a routing circuit, each of the at least one first product value to at least one corresponding calculation circuit in the first calculation circuits in the low power mode.

12. The operation method according to claim 11, further comprising:
receiving, by the first calculation circuits, the first element values in the column of the first matrix during the first period;
respectively multiplying, by the first calculation circuits, the first element values by the second element value in the second matrix to obtain a plurality of second product values when the first calculation circuits operate in the normal mode; and
respectively adding, by the first calculation circuits, the second product values to the first multiply-accumulate values in the normal mode.

13. The operation method according to claim 11, further comprising:
respectively adding, by the first calculation circuits, the at least one first product value provided by the routing circuit to the first multiply-accumulate values when the first calculation circuits operate in the low power mode.

14. The operation method according to claim 11, further comprising:
receiving, by a multiplier, a corresponding element value of the first element values during the first period;
multiplying, by the multiplier, the corresponding element value by the second element value in the second matrix in the normal mode to obtain a second product value;
selecting, by a multiplexer, to output the second product value as an accumulation object in the normal mode;
selecting, by the multiplexer, to output the corresponding product value as the accumulation object in the low power mode; and
adding, by an accumulation circuit, the accumulation object to a corresponding multiply-accumulate value in the first multiply-accumulate values.

15. The operation method according to claim 14, further comprising:
disabling the multiplier in the low power mode to reduce power consumption.

16. The operation method according to claim 11, further comprising:
multiplying, by at least one multiplier of the multiplication circuit, the at least one first classification value by the second element value in the second matrix in the low power mode, to obtain the at least one first product value.

17. The operation method according to claim 16, further comprising:
disabling the at least one multiplier in the normal mode to reduce power consumption.

18. The operation method according to claim 11, further comprising:
producing, by a plurality of second calculation circuits, a plurality of second multiply-accumulate values in a second column of the product matrix;
receiving, by the control circuit, a plurality of second element values in a row of the second matrix during the first period;
classifying, by the control circuit, the second element values into at least one second classification value;
controlling, by the control circuit, the first calculation circuits and the second calculation circuits to operate in the low power mode when the first classification quantity is less than or equal to the first classification threshold and a second classification quantity of the at least one second classification value is less than or equal to a second classification threshold; and
controlling, by the control circuit, the first calculation circuits and the second calculation circuits to operate in the normal mode when the first classification quantity is greater than the first classification threshold or the second classification quantity is greater than the second classification threshold.

19. The operation method according to claim 18, further comprising:
multiplying, by the multiplication circuit, any of the at least one first classification value by any of the at least one second classification value in the low power mode, to obtain the at least one first product value.

20. A matrix multiplication device configured to multiply a first matrix by a second matrix to produce a product matrix, the matrix multiplication device comprising:
a plurality of calculation circuits configured to produce a plurality of first multiply-accumulate values in a first column of the product matrix, wherein the calculation circuits comprise at least one first calculation circuit and at least one second calculation circuit;

a control circuit configured to receive a plurality of first element values in a column of the first matrix during a first period, wherein the control circuit classifies the first element values into at least one first classification value, the control circuit controls the calculation circuits to operate in a low power mode when a first classification quantity of the at least one first classification value is less than or equal to a first classification threshold, the at least one first calculation circuit multiplies the at least one first classification value by a second element value in a first column of the second matrix in the low power mode to obtain at least one first product value, and the control circuit controls the calculation circuits to operate in a normal mode when the first classification quantity is greater than the first classification threshold; and a routing circuit coupled to the at least one first calculation circuit to receive the at least one first product value, wherein the routing circuit transmits each of the at least one first product value to at least one corresponding calculation circuit in the calculation circuits in the low power mode.

21. The matrix multiplication device according to claim 20, wherein the calculation circuits are configured to receive the first element values in the column of the first matrix during the first period, the calculation circuits respectively multiply the first element values by the second element value in the second matrix in the normal mode to obtain a plurality of second product values, and the calculation circuits respectively add the second product values to the first multiply-accumulate values in the normal mode.

22. The matrix multiplication device according to claim 20, wherein in the low power mode, the calculation circuits respectively add, to the first multiply-accumulate values, the at least one first product value provided by the routing circuit.

23. The matrix multiplication device according to claim 20, wherein any of the at least one first calculation circuit comprises:

a first multiplexer configured to receive a corresponding element value in the first element values during the first period, wherein the first multiplexer is coupled to the control circuit to receive a corresponding classification value in the at least one classification value, the first multiplexer selects to output the corresponding element value as a multiplication object in the normal mode, and the first multiplexer selects to output the corresponding classification value as the multiplication object in the low power mode;

a multiplier coupled to the first multiplexer to receive the multiplication object, wherein the multiplier multiplies the multiplication object by the second element value in the second matrix to obtain a product, and the routing circuit receives the product as one of the at least one first product value in the low power mode;

a second multiplexer coupled to the multiplier to receive the product and coupled to the routing circuit to receive a corresponding product value in the at least one first product value, wherein the second multiplexer selects to output the product as an accumulation object in the normal mode, and the second multiplexer selects to output the corresponding product value as the accumulation object in the low power mode; and an accumulation circuit coupled to the second multiplexer to receive the accumulation object, wherein the accumulation circuit adds the accumulation object to a corresponding multiply-accumulate value in the first multiply-accumulate values.

24. The matrix multiplication device according to claim 20, wherein any of the at least one second calculation circuit comprises:

a multiplier configured to receive a corresponding element value in the first element values during the first period, wherein the multiplier multiplies the corresponding element value by the second element value in the second matrix in the normal mode to obtain a product;

a multiplexer coupled to the multiplier to receive the product and coupled to the routing circuit to receive a corresponding product value in the at least one first product value, wherein the multiplexer selects to output the product as an accumulation object in the normal mode, and the multiplexer selects to output the corresponding product value as the accumulation object in the low power mode; and an accumulation circuit coupled to the multiplexer to receive the accumulation object, wherein the accumulation circuit adds the accumulation object to a corresponding multiply-accumulate value in the first multiply-accumulate values.

25. The matrix multiplication device according to claim 24, wherein the multiplier is disabled in the low power mode to reduce power consumption.

* * * * *